Jan. 1, 1974  A. R. HURST ET AL  3,783,089
HEAT SEALED, READILY PEELABLE OR TEARABLE STRUCTURE
SUITABLE FOR CLOSURES, LABELS, PACKAGING, ETC.
Original Filed April 16, 1969

INVENTOR.
A.R. HURST
S.S. MIRASOL
BY
*Young & Quigg*
ATTORNEYS

United States Patent Office 3,783,089
Patented Jan. 1, 1974

3,783,089
HEAT SEALED, READILY PEELABLE OR TEAR-ABLE STRUCTURE SUITABLE FOR CLOSURES, LABELS, PACKAGING, ETC.
Alan R. Hurst, Hinsdale, Ill., and Salustiano S. Mirasol, Kansas City, Mo., assignors to Phillips Petroleum Company, Bartlesville, Okla.
Continuation of abandoned application Ser. No. 816,506, Apr. 16, 1969. This application July 28, 1971, Ser. No. 166,981
Int. Cl. B32b 27/08, 27/32; B65d 65/40
U.S. Cl. 161—166
16 Claims

ABSTRACT OF THE DISCLOSURE

A container or tray, preferably flanged, is closed with a composite peelable closure sheet heat sealed thereto. The embodiment described will remain sealed when subjected to ranges of temperatures of from about —40° to about 212° F. Yet, the closure remains readily removable.

The container can be made and is now preferred to be made of a high density polyethylene or a material of which at least the surface, which is heat sealed, is made of such a polyethylene. The closure sheet or composite can be made and is now preferred to be of a polyamide or other relatively high melting material, e.g., a polyester. Presently a nylon, e.g., nylon-6 resin onto which is coated, for the heat sealing thereof to the tray or container, a film of a low density polyethylene, is preferred. The adhesion is obtained or a container is closed hermetically by placing the composite sheet upon the portion, e.g., flange of the container at which it is to sealingly engage the same. The low density polyethylene side of the composite sheet is in contact with the container and the heat seal then engendered. A particular type of combination of materials used permits the film to pull cleanly from the container, leaving the flange or other sealed surface thereof neat and in a particular case, retaining the low density polyethylene which produced the seal as a just noticeably bead-like line on the flange when a line-seal has been employed.

The container can be a high density coated paperboard container such as a milk container or a blister package, etc. Also the combination of materials can be used to label goods.

The useful combination of materials to fashion tear strips, labels, etc. is also disclosed.

This application is a continuation of Ser. No. 816,506, filed Apr. 16, 1969, now abandoned.

In one aspect of this invention it relates to a peelable closure heat sealed container; that is, it relates to a combination of a peelable sealed lid film closure for a container which in use is sealed by sealing the peelable seal film to the container. In another of its aspects the invention relates to a peelable laminate element or composite sheet or film which can be affixed to a corresponding surface for tight adhesion thereto yet readily be removed therefrom.

In one of its concepts the invention provides a container having as at least one of its walls a readily removable or peelable sealing member, film or sheet, say, a lid or composite or a coated film, the container being formed from a high density polyethylene and the peelable sealing sheet being formed by laminating or otherwise joining onto a polyamide substrate, e.g., nylon-6, a thin film of a low density polyethylene, the laminate or affixed materials thus obtained being placed with the low density polyethylene layer in contact with the container to engender a seal by heat sealing the laminate thus positioned to the container.

In another of its concepts the invention provides a method for producing a heat sealed container or package or tray which comprises forming at least a sealing or surface portion of such a tray or container of a high density polyethylene, laminating together a suitable substrate and a low density polyethylene placing the laminate or composite thus produced with the polyethylene side of contact with the sealing surface or portion of said tray and accomplishing the closure or sealing of the container by heat sealing at least along at least one line at the juncture of the low density and high density polyethylene surfaces.

In a further concept of the invention it provides a composite of an affixed portion of at least two films or sheets, as described herein, one of the sheets or films having a melting point substantially higher than the other, the lower melting material being capable of being readily melted as in a heat sealing operation to provide a heat engendered seal, the composite being placed into touching engagement with a further material also having a melting temperature substantially above that of said lower melting material to which it can be heat sealed, as desired, for example, to hold an object as in blister packaging, hermetic enclosure of foodstuffs as affixing at least one or a series of labels together as on a package or box or equipping container or other objects with a tear strip.

In the container art, particularly in the food packaging art, the lubricant art, as well as other arts, there has been a need for a rugged, hermetically sealed, yet readily openable, light weight package, container or tray. There has also been a desire to produce such a package sealed with a readily removable see-through film, which may even be printed with some legend. Also there is great demand for holding, protectively, items such as are currently blister packaged. Further, in the labeling art there is need for improved labeling and packaging of labels.

We now have conceived of a combination of materials and a structure accomplished therewith which will permit the formation of a heat sealed container or tray as herein described. Further, our combination of materials are such as to provide a see-through package, that is to say, a package having at least a lid or a closure portion sufficiently transparent that the contents of the package can be viewed without opening the package. Also, it is possible, we have found, to use our combination of materials to produce a heat sealed closure on coated containers such as high density polyethylene coated paperboard milk containers, as tear strips used on such containers or other items and, generally, to hold or to protect an item or series of items as in a blister package or to provide improved labeling of goods or boxes.

It is an object of this invention to produce a peelable closure heat sealed container. It is a further object of this invention to provide a heat sealed, see-through closure lid for a container such as a tray container or for a slit or other opening in a milk-type container which can be neatly peeled therefrom. It is another object of this invention to provide a heat sealed closure upon a container or tray which can be subjected to a wide range of temperatures and other ordinarily adverse conditions yet remain sealed and readily openable by simply pulling the closure from the container. It is a further object of the present invention to provide a readily removable heat sealed tear strip, label or retaining element as for holding one or a series of items, like a set of screws or prills or as in blister packaging.

According to the present invention there is provided a method for producing a sealed container or tray which comprises producing a tray, at least the surface of which is composed of high density polyethylene, laminating together a film of, say, a polyamide and a thin low density polyethylene layer positioning the laminate or composite film thus produced onto said container in contact at least along a line at which heat sealing is desired to be engendered to seal the container, or to produce, say, a tear-strip thereon, and then heat sealing together the low density polyethylene and the high density polyethylene.

Also according to the present invention there is provided a heat sealed container, the closure member thereon for the effectively operative portion thereof being composed of a laminated structure or composite, one side of which is composed of, say, a polyamide substrate and the other side of which is composed of a low density polyethylene layer, the container portion at least for the surface at which a closure is to be effective being composed of a high density polyethylene. Further according to the invention, there is provided a system comprising a structure or laminate having a polyamide substrate to which there is formed a film of polyethylene having a tensile strength and tear strength relatively lower than a high density polyethylene to which the substrate is or can be heat sealed by bringing the film of polyethylene formed on the structure into contact with said high density polyethylene and then heat sealing said structure to said high density polyethylene.

It will be obvious to one skilled in the art having studied this disclosure that various shapes and sizes of containers or other structures or items as are herein disclosed or suggested can be produced embodying the combination of materials which here permit the production of a readily separable film from the overall structure. Such structures can include structures as herein defined or suggested which are produced for containing milk, blister packaging, tear strips used for sealing or covering openings or for labeling, etc.

Referring now to the drawings.

Figure 1:
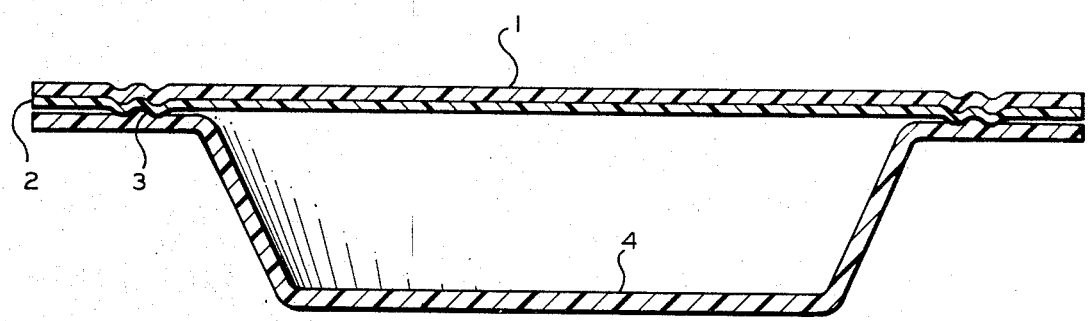
FIG. 1 is an elevational cross section of a tray or container according to the invention.

Referring now to the drawing in FIG. 1. 1 is a polyamide substrate, in this instance nylon-6; 2 is a thin low density polyethylene; 3 indicates the points or lines of seal after sealing; and 4 is a high density polyethylene tray.

Figure 2:
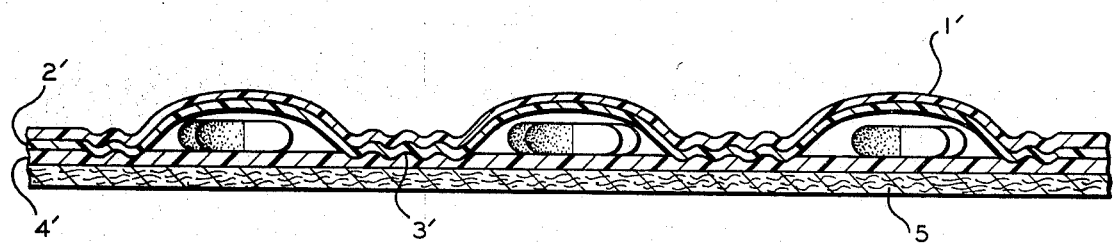
FIG. 2 is an elevational cross section of a blister package according to the invention.

Referring now to FIG. 2 in which primed numbers indicate the same kind of materials that are shown in FIG. 1, these are a plurality of objects, three in all, blisher-packaged employing a high density polyethylene coated cardboad 5.

Requirements for the closure substrate or backing film include suitable tear strength, tensile strength, elongation and relatively high melting point. Minimum values of these properties, in general, are about 20 grams/mil tear strength (ASTM D–1922–61T), 3000 p.s.i. tensile strength and 50 percent elongation (ASTM D–882–64T), and 260° F. melting point. Such thermoplastic polymers as polycarbonates, polyesters, e.g., polyethylene terephthalate, polyolefins such as linear polyethylene or polypropylene, polyamides, etc., satisfy wholly on in part the requirements.

At the present time, however, the preferred substrate material is a polyamide. Illustrative of suitable polyamides are the polymers formed by polymerizing E-caprolactam to form nylon-6, polymerizing 11-aminoundecanoic acid to form nylon-11, polymerizing 12-aminododecanoic acid to form nylon-12, condensing hexamethylene diamine with adipic acid to form nylon 6/6 or with sebacic acid to form nylon 6/10, etc. Nylon-6 is presently a preferred member of the polyamide family to use for this application. Its molecular weight is preferably greater than 10,000 so that the physical properties of film prepared from the polymer meet or exceed the previously stated requirements. A typical film of about 0.25–3.0 mils in thickness may exhibit a tear strength ranging from 30–100 grams/mil, tensile strength ranging from about 6000–12,000 p.s.i. and an elongation ranging from about 150–600 percent.

To provide additional barrier properties, decorative effects, opaqueness, etc. another material or materials such as polyvinyl chloride, polyvinylidene chloride, lead, soft aluminum or other metal foil, cellulosic material, etc. is laminated to the reverse side of the substrate.

The film laminate or composition, which according to the invention is now preferred, is preferably prepared by extrusion coating a thin, low density polyethylene layer onto a substrate composed essentially of nylon-6. The low density polyethylene can be adhesively joined or affixed to the polyamide as will be understood by one skilled in the art of packaging, labeling, etc. The laminated film, polyethylene side down is placed over the high density polyethylene object or coated paperboard or other material and heat sealed to the object, e.g., a tray as to the flange thereof by application of heat as through the polyamide backing.

The thickness of the nylon substrate can vary from about 0.25 to about 3 mils and may in some instances be outside this range, depending upon the particular application needed to be accomplished. For trays of the kind described in connection with FIG. 1 and related applications, a thickness of the nylon substrate in the approximate range of from about 0.75 to about 1.75 or so mils is now preferred. In the now preferred embodiment of a food tray containing package, the polyamide film has a thickness of about 1.5 mils. This film, as combined with the low density polyethylene as described herein, will have a combined tear strength of the order of 500 or more grams per mil. Thus, a nylon-6 resin film of 1½ mils combined with a low density polyethylene film of ½ mil gives a combined tear strength of approximately 510 grams per mil.

The polyamide or other film surface can be printed on one side with the low density polyethylene coating on the other side, or it can be reversed printed with low density polyethylene coating and/or lamination over ink with no coating and/or lamination on the opposite polyamide surface.

The heat sealing conditions are known in the art. These can be determined by mere routine test for the particular combination to be heat sealed.

The low density polyethylene used to coat the polyamide or other substrate is preferred to be one with a density in the approximate range of 0.914 to 0.925 g./cc. (ASTM D–1505–63T) and a melt index ranging from about 0.5 to about 14 (ASTM D–1238–62T, condition "E"). In the presently preferred embodiment, the resin has a density of about 0.923 g./cc. and a melt index of about 3–4. Copolymers of ethylene with propylene, isobutylene, 1-olefins such as 1-butene, 1-hexene, etc., vinyl acetate, ethyl acrylate, etc., are also suitable when their vicat softening point temperature range (ASTM D–1525–58T) preferably falls about in the same range as low density polyethylene, e.g., about 185–210° F. Polymers with lower softening point temperatures are operable as coating materials but may be subject to failure of the seal at the elevated temperatures sometimes encountered in storage.

The thickness of the polyethylene coating will range from about 0.2 to about 1.5 mils, but perhaps more. A now preferred range being about 0.4–0.7 mils. In the embodiment described in connection with FIG. 1 of the drawings, a 0.5 mil coat is used.

The polyethylene tray is made from high density linear polymer with at least a density of 0.945 g./cc. To obtain the peelable seal for the container of FIG. 1 of the drawing, the sealing temperature ranges from about 300 to 360° F. A now preferred range is from about 310 to about 340° F. Generally, the heat sealing will be accomplished at a temperature which the routineer sealer can determine depending upon the particular combination of materials and their physical structure.

The relative dimensions as well as the absolute dimensions of the aspects which embody the invention will depend upon the utility to which they are to be put. Heavier gauge material can be used to provide containers for heavier materials or goods, etc.

While herein a preferred form of the invention is a tray having a rectangular shape it should be recognized that other shapes such as cylindrical, box-like, etc., fall within the scope of the invention.

Presently, nylon appears to be the best backing material although a polyester such as polyethylene terephthalate and a polycarbonate are also considered as applicable in certain instances. At present, low density polyethylene as herein described appears to be quite suitable as bonding or sealing material for the preferred application and in most instances for the other applications described herein.

As an especial feature of the polyamide or nylon backing, it appears to allow some stretching thus contributing that factor to the separation process which one skilled in the art will understand helps to more effectively peel away the covering closure.

After the initial peeling force has been exerted, thus imparting a stretch to the lid, the stretching lid with continued pull thereon progressively exerts a corresponding pull on the seal which progressively yields to the pull transmitted by the backing (substrate) film in its described condition. Apparently the forces are such that the closure is readily peelable whether a peel seal or weld seal or a mixture of the two has been made. In any event, the separation occurs due to the combination of all the effects here disclosed, and others, which one skilled in the mechanics of the matter having studied the disclosure will understand.

The heat sealing will, of course, depend upon the particular machine, size of the iron, the pressure, the time, and the temperature of the iron. It will also depend upon the thickness of the backing as well as the nature of the low density polyethylene and its configuration.

It will be understood by one skilled in the art that the bonding or sealing material is required to be one with a lower melting point than either the backing film or the container or the flange or portion to which it is sealed. Thus, it must have the lowest tensile strength and tear strength as well. Thus, when a suitable sealing temperature is employed the bond formed during the heat sealing will be the weakest point of the structure and preferentially will cleanly fail when the closure is peeled away. It is important to have a suitable thinness of the low density polyethylene coat or film which need not cover, necessarily, the entire surface of the closure film, but is most conveniently applied to do so. If the polyethylene coating is too thin a continuous peel seal may not be obtained consistently, especially at higher sealing temperatures. A too thick coating may result in too strong, a seal since obviously the overall dimension of the seal viewed in cross section will determine the tearing or peeling strength.

It is possible with the combination of materials discussed herein to result in a structure in which the tearing or peeling away of the closure label, etc. without tearing the nylon backing or tearing the flange or leaving an unsightly bonding remnant thereon, can be easily accomplished.

It is within the scope of the invention to provide a readily peeleable seal in which one or more line-weld seals and/or mechanical seals and one or more true peel seals are simultaneously made in the seal area. This is accomplished by concentrating more of the pressure at the sides of the seal than in the center, for example, by using a resilient back up plate supporting the container cooperating with a concave shaped sealing member engaging the closure during the sealing operation.

In the affixing of labels to containers the high density polyethylene base can be sprayed onto the container or otherwise adhered thereto. Then the label with its low density polyethylene side placed against the base can be quickly heat sealed thereto, at the place of destination of the container the label can be readily removed to reveal assembling or other information on its reverse side or encompassed therebetween and the base.

Reasonable variation and modification are possible within the foregoing disclosure and the appended claims to the invention the essence of which is that a polyamide, polycarbonate, polyester, etc. substrate coated with a thin film, sheet or layer of a low density polyethylene or other heat sealable material as herein described is heat sealed by means of the low density polyethylene, as by heating through the polyamide substrate, to a container or other object at least the surface of which, which is in contact with the low density polyethylene during heat sealing and which is composed of a high density polyethylene, substantially as described.

We claim:

1. An object having a readily peelable heat seal, said object having a high density polyethylene surface at least a portion of which is engaged by said heat seal and a removable composite see-through transparent portion readily peelably heat sealed to said surface by said heat seal which will remain heat sealed when subjected to temperatures of from about $-40°$ to about $212°$ F., yet remain readily removable, said removable portion being composed of a substrate selected from a polyamide, polycarbonate, polyester, and a linear polyolefin, said substrate having a thin coating thereon of a low density polyolefin having a density in the approximate range 0.914–0.925 g./cc. said coating being of a thickness in the range of from about 0.2 to about 1.5 mils, said readily peelable heat seal being composed essentially of a portion of said coating which has been heated while in contact with said high density polyethylene surface to cause said readily peeleable heat seal to be formed between said surface and said removable portion, said high density polyethylene having a density of at least 0.945 g./cc.

2. An object having a readily cleanly peelable heat seal, said object having a high density polyethylene surface at least a portion of which is engaged by said heat seal and a composite removable portion readily peelably heat sealed to said surface by said heat seal, said removable portion being see-through transparent and being composed of a substrate selected from polyamide and a polyester, said substrate having a thin coating thereon of a lower density polyethylene having a density substantially lower than that of said high density polyethylene, said lower density polyethylene having a density in the approximate range 0.914–0.925 g./cc. and a thickness in the range of from about 0.2 to about 1.5 mls and said readily peelable heat seal being composed essentially of said lower density polyethylene coating which has been heated while at least a portion thereof has been in contact with said high density polyethylene surface, said high density polyethylene having a density of at least 0.945 g./cc.

3. An object according to claim 2 wherein the high density polyethylene surface is at least a portion of a packaging container.

4. An object according to claim 3 wherein the high density polyethylene surface forms a portion of the wall of said container.

5. An object according to claim 1 wherein the high density polyethylene surface is at least a portion of a food packaging tray and the removable portion is a cover on said tray and engaging the same heat sealingly and peelably.

6. An object according to claim 1 wherein the removable portion is a label.

7. An object according to claim 1 wherein the removable portion is a tear strip.

8. An object according to claim 1 wherein the removable portion is a blister package cover.

9. An object according to claim 1 wherein the polyamide is nylon-6, the high density polyethylene has a density of at least about 0.945 g./cc. and the lower density polyethylene has a density in the approximate range 0.914 to 0.925.

10. A method for making a heat-sealed object, package or container having a removable transparent, see-through closure member which comprises bringing together a film of at least one material selected from a polyamide, polycarbonate, and a polyester, with a film of a low density polyethylene, having a density in the approximate range 0.194–0.925 g./cc., to form ultimately a readily removable first member, forming said closure member, placing said films upon a second member thus completing said object, package or container, said second member at least for the heat sealed portion of it having at least its surface composed of a high density polyethylene, said films and said second member being in contact so that the two polyethylenes touch each other and heat sealing together said films and said member, thus forming a readily peelable seal essentially consisting of said low density polyethylene, said high density polyethylene having a density of at least 0.945 g./cc.

11. An object according to claim 1 wherein said low density polyolefin coating is selected from low density polyethylene and a copolymer of ethylene with at least one of propylene, isobutylene, 1-butene, and 1-hexene.

12. An object according to claim 1 wherein the substrate is selected from nylon, polyethylene terephthalate, polypropylene or polyethylene and the low density polyolefin coating is low density polyethylene on a copolymer of ethylene with at least one of propylene, isobutylene, 1-butene, 1-hexene, ethyl acrylate and vinyl acetate.

13. An object according to claim 1 wherein the substrate is nylon-6, the thickness of the substrate is about 0.25 to about 3 mils, the low density polyolefin is polyethylene having a density in the approximate range of 0.914 to 0.925 g./cc. and a melt index ranging from about 0.5 to about 14.

14. An object having a heat seal, said object having a high density polyethylene surface, at least a portion of which is engaged by said heat seal and a removable transparent, see-through portion heat sealed to said surface by said heat seal, said removable portion being composed of a substrate selected from a polyamide, polycarbonate, polyester, and a linear polyolefin, said substrate having a coating thereon of a lower density polyolefin, having a density in the approximate range 0.914–0.925 g./cc., such as low density polyethylene or a lower density copolymer of ethylene with propylene, isobutylene, 1-olefins such as 1-butene, 1-hexene, ethyl acrylate, and vinyl acetate, said heat seal being composed essentially of said coating which has been heated to cause a seal to be formed between said surface and said removable portion, said high density polyethylene having a density of at least 0.945 g./cc.

15. An object having a readily peelable heat seal, said object having a high density polyethylene surface at least a portion of which is engaged by said heat seal and a removable composite see-through transparent portion readily peelably heat sealed to said surface by said heat seal which will remain heat sealed when subjected to temperature of from about −40° to about 212° F., yet remain readily removable, said removable portion being composed of a substrate selected from a polyamide, polycarbonate, polyester, and a linear polyolefin, said substrate having a thin coating thereon of a low density polyolefin having a density in the approximate range 0.914–0.925 g./cc., said coating being made from a thin film of the order of about 1.5 mils, said readily peelable heat seal being composed essentially of a portion of said coating which has been heated while in contact with said high density polyethylene surface to cause said readily peelable heat seal to be formed between said surface and said removable portion, said high density polyethylene having a density of at least 0.945 g./cc.

16. An object having a readily peelable heat seal, said object having a high density polyethylene surface at least a portion of which is engaged by said heat seal and a removable composite see-through transparent portion readily peelably heat sealed to said surface by said heat seal which will remain heat sealed when subjected to temperatures of from about −40° to about 212° F., yet remain readily removable, said removable portion being composed of a substrate selected from a polyamide, polycarbonate, polyester, and a linear polyolefin, said substrate having a thin coating thereon of a low density polyolefin, said coating consisting essentially of a polyethylene having a density in the approximate range of 0.914 to 0.925 g./cc., a melt index ranging from about 0.5 to about 14 and being applied to said substrate as a thin film, said readily peelable heat seal being composed essentially of a portion of said coating which has been heated while in contact with said high density polyethylene surface to cause said readily peelable heat seal to be formed between said surface and said removable portion, said high density polyethylene having a density of at least 0.945 g./cc.

References Cited
UNITED STATES PATENTS

| | | | |
|---|---|---|---|
| 3,491,935 | 1/1970 | Trotter et al. | 156—306 |
| 3,454,210 | 7/1969 | Spiegel et al. | 229—5 WB |
| 3,547,338 | 12/1970 | Hemmes | 229—51 WB |
| 3,552,638 | 1/1971 | Quackenbush | 229—51 WB |
| 3,256,981 | 6/1966 | Kurtz | 229—51 WB |
| 3,496,061 | 2/1970 | Freshour et al. | 229—48 T |
| 3,511,436 | 5/1970 | Kessler | 229—51 WB |
| 3,217,871 | 11/1965 | Lee | 229—51 WB |
| 3,647,485 | 3/1972 | Seiferth et al. | 156—306 X |
| 3,655,503 | 4/1972 | Stanley et al. | 229—51 WB |

HAROLD ANSHER, Primary Examiner

U.S. Cl. X.R.

53—39, 381 A; 161—406; 206—Dig. 16